Jan. 5, 1937.     G. B. WATKINS     2,066,497
ART OF DECORATING GLASS
Filed June 2, 1933
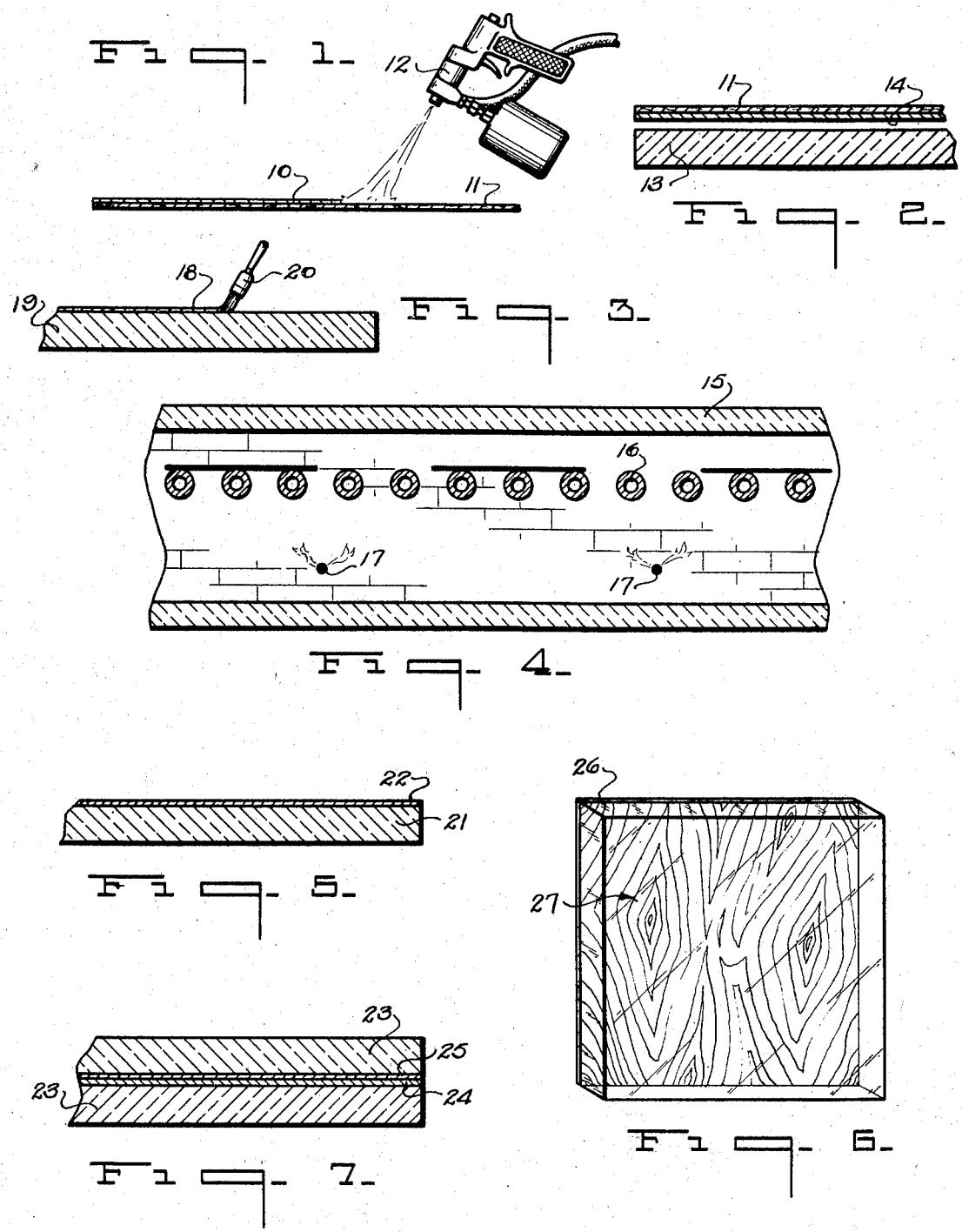
Inventor
GEORGE B. WATKINS.
By Frank Fraser
Attorney Patented Jan. 5, 1937

2,066,497

UNITED STATES PATENT OFFICE 2,066,497

ART OF DECORATING GLASS

George B. Watkins, Toledo, Ohio, assignor to Libbey-Owens-Ford Glass Company, Toledo, Ohio, a corporation of Ohio Application June 2, 1933, Serial No. 674,067

4 Claims. (Cl. 41—36)

The present invention relates to the art of decorating glass, and particularly to a process involving the use of a suitably colored synthetic resin and to the process of applying the same to glass surfaces.

The arts of photography and printing have progressed to the point where expensive woods, marbles, fabrics, and similar things can be reproduced with remarkable faithfulness in the making of transfers. The primary object of the present invention is to provide an improved transfer which may be applied to glass surfaces in such a way as to be lasting and relatively inexpensive.

I have done considerable experimental work with so-called transfers and decalcomanias obtainable on the open market, but consistently satisfactory results have not been obtained and the cost of manufacture has been prohibitive. In my opinion, one of the main reasons that such transfers have not proven satisfactory resides in the fact that most, if not all, of them are essentially lacquer transfers containing nitro-cellulose and varnish. The majority of these transfers are not permanent either as to their adherence to the glass to which they are applied or with regard to their stability toward light and heat energy.

In accordance with the present invention, a sheet of glass or an assembly of glass and plastic is decorated with a film or films of suitably pigmented synthetic resin such as a polybasic acid, polyhydric alcohol type resin, of which the glyptal lacquer is a specific example.

Broadly stated, the glass is decorated by applying the resin to the glass and then heating the same to convert the resin to the insoluble and infusible stage to effect a permanent and lasting decorated glass. The invention also contemplates the use of "inks" composed of glyptal lacquer having the desired pigments suspended therein, so that the transfer or decorative film will be practically composed entirely of the resin and the coloring pigments.

In the drawing wherein like numerals are employed to designate like parts throughout the same, Fig. 1 illustrates diagrammatically the building up of the transfer on a temporary backing, Fig. 2 is a fragmentary sectional view showing diagrammatically the application of the preformed transfer to a sheet of glass, Fig. 3 is also a fragmentary sectional view illustrating the application of the resin directly to the glass which is in contra-distinction to the application of the resin material to a temporary backing, Fig. 4 is a vertical longitudinal section through a heated tunnel which can be used in the transformation of the resin coating to the insoluble and infusible stage, Fig. 5 is a fragmentary sectional view of a single sheet of glass having the finished decorated film thereon, Fig. 6 is a perspective view of the finished sheet of Fig. 5, showing the use of a wood design, and Fig. 7 is a fragmentary sectional view showing the use of the decorating film with laminated safety glass comprising two sheets of glass and an interposed tough plastic layer.

There are a number of ways in which the glass sheet or other material can be decorated in accordance with this invention. In Fig. 1 is shown diagrammatically the building up of the transfer 10 on the temporary backing 11. It has been customary in the prior art to make the lacquer transfers containing nitro-cellulose and varnish on paper with an adhesive, such as gelatin, being applied to the outside surface of the transfer to permit bonding thereof to the surface on which the transfer is applied. The backing material can also be cloth or other satisfactory temporary backing. As shown, the resin is being applied to the backing by means of an air gun 12. To permit spraying of the resin, the resin is of course dispersed in a suitable solvent or mixture of solvents, and any number of coatings can be applied to the backing until the desired thickness of resin film is built up. In lieu of the spray gun illustrated, the film can be made by flowing, a film machine, brushing, or by other well known methods.

After the film 10 has been formed, the design is printed or otherwise applied to the film. As is shown in Fig. 6, the film has been made to resemble wood. Marbles, tiles, or fanciful designs can be applied and in fact there is practically no limit to the range of materials that can be imitated. For example, fancy laces, fabrics, and such things have been reproduced with very satisfactory results by first photographing the original to be copied and then resorting to one of several methods of printing such as, for example, photolithographing.

In the case where the resin is dispersed in considerable solvent, it may be desirable to dry the coating between successive coats and also before printing.

While it is not absolutely necessary, I consider it desirable to use an ink formed by suspending the necessary pigments in a synthetic resin such as, for example, a glyptal lacquer.

It will be understood that in the application of transfers to glass, the method is just the reverse of that used in applying transfers to metal and wood in that with the glass the top side of the transfer is applied directly to the glass surface so that it is visible when looking through the glass. Where the transfers are applied to opaque materials such as wood, steel, etc., the bottom side of the transfer is applied to the wood or steel, and then after the temporary backing is removed, the face of the transfer is seen. Obviously, where the transfer is applied to glass, it is protected by the glass plate itself, whereas in the case of wood or metal or other opaque materials, the transfer is on the exposed surface.

After the resin film has been built up on the backing 11 and suitably decorated, it may be transferred to the glass sheet 13 shown in Fig. 2. The outer exposed surface 14 of the transfer, carrying the desired design, is placed in direct contact with the sheet 13, after which the backing 11 is removed.

The sheet of glass with the decorated resin film is then heated and this may be done in a tunnel 15 containing the roller conveyor 16 and temperature control means 17. It is preferred that the glass be subjected to an approximate temperature of 275 degrees Fahrenheit for a period of from twelve to fifteen hours which is sufficient to convert the resin into the insoluble, infusible stage resulting in an article which is permanent and water-proof.

Very satisfactory results have been obtained when using glyptal lacquer which is one example of the polybasic acid, polyhydric alcohol type of synthetic resin. If other resins are used, the period of heat treatment may have to be varied, the cycle set forth above being applicable to the glyptal lacquer transfer.

In Fig. 3, a modified form of the invention is illustrated wherein the resin film 18 is built up directly upon the glass sheet 19 instead of being temporarily formed on the backing 11. The formation of the film has been shown diagrammatically as being formed by a brushing step with the brush 20, but it will be understood that the spray gun 12 can be used or the resinous deposit can be built up by flowing or by the use of regular film machines. After the deposit 18 is made of the desired thickness, it is decorated or printed to resemble whatever article is to be imitated. On the other hand, the design can be printed directly upon the glass before the resinous film is applied.

In some cases, where a solid color background is desired, for example in partition walls, tile work, etc., the entire film may be pigmented to give gold, gray, or any other color. That is, where woods, marbles, fabrics, and such materials are to be reproduced, it is necessary to print the design either on the glass or on the film, but where solid colors are desired, the printing step can be dispensed with and the entire film pigmented as will readily be understood. Of course, even solid colors can be obtained by the printing method if desired, but in most cases it is simpler to resort to pigmenting of the entire film, and it is for this reason that the suggestion is made.

Fig. 5 designates the sheet of glass 21 containing the coating 22 of the synthetic resin which has been converted to the insoluble, infusible stage.

Fig. 7 shows a slightly modified form in which a sheet of laminated safety glass has been decorated. This structure comprises the two sheets of glass 23, the interposed sheet of tough plastic material 24, and the transfer 25. The sheet 24 may be made of such materials as pyroxylin plastic and cellulose acetate. In applying the invention to this type of glass, one sheet of glass can be decorated as above described and then combined with the plastic sheet 24 and the other sheet of glass 23. On the other hand, the transfer 25 can be applied to either of the outer surfaces of the glass sheets.

Fig. 6 is intended to show a finished sheet of glass in which the film 26 has been decorated with a reproduction of a piece of wood. It will be noted that the design is seen when looking through the glass sheet 27.

The synthetic resins, particularly of the polybasic acid, polyhydric alcohol type can be bonded very satisfactorily to glass, and are permanent when converted to the insoluble and infusible stage. Likewise, they are not seriously affected by light and heat energy. Probably in the most cases, this type of decorated glass will find utility for interior decoration purposes, so that the life thereof, for all practical purposes, will be the same as the life of the building in which it is used, unless of course the glass should accidentally become broken. Furthermore, where there is some possibility of sufficient light to cause fading of the pigments, a glass can be used that will absorb those rays from the light passing therethrough which are harmful.

It will also be understood that large pieces or block sizes of glass can be decorated and then cut to fit on the job.

I claim:

1. In the art of decorating, the process consisting of depositing a film of colored synthetic resin upon a sheet of glass, and then heating the glass and film to convert the resin to the insoluble and infusible stage to permanently bond the film to the glass.

2. In the art of decorating, the process consisting of creating a film of synthetic resin, printing a colored design upon the film, then placing the same upon a piece of glass, and subjecting the glass and film to heat to convert the resin to the insoluble and infusible stage and to permanently bond said resin to the glass.

3. In the art of decorating, the process consisting of building up a film of a polybasic acid, polyhydric alcohol type of resin and pigments arranged to give the desired design, then placing the said film upon a piece of glass, and subjecting the glass and film to heat for a sufficient length of time to convert the said polybasic acid, polyhydric alcohol type of resin to the insoluble and infusible stage and to permanently bond it to the glass.

4. In the art of decorating, the process consisting of building up a film of glyptal lacquer and pigments arranged to give the desired design, then placing the said film upon a piece of glass, and subjecting the glass and film to heat for a sufficient length of time to convert the said glyptal lacquer to the insoluble and infusible stage and to permanently bond it to the glass.

GEORGE B. WATKINS.